Patented June 10, 1930

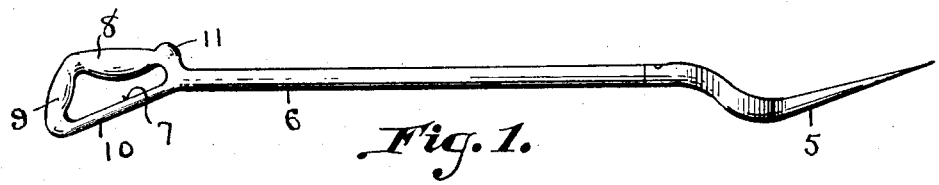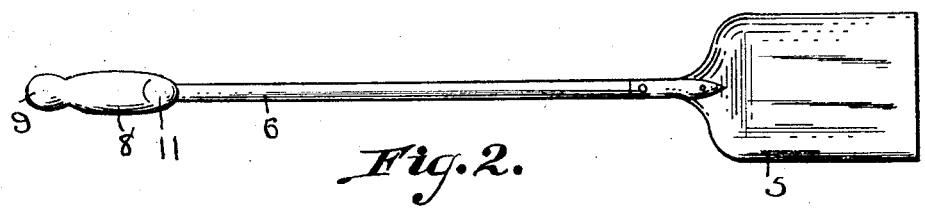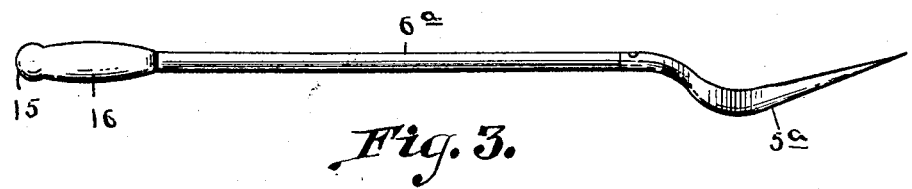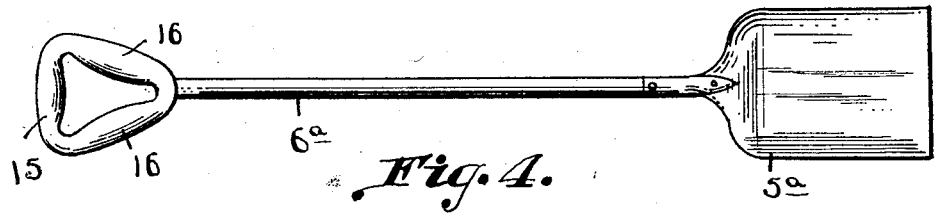

1,762,718

UNITED STATES PATENT OFFICE

DAVID F. HERVEY, OF LOGANSPORT, INDIANA

HANDLE FOR IMPLEMENTS

Application filed May 25, 1929. Serial No. 365,976.

This invention relates to improvements in handles for implements and is specially adapted for use in connection with shovels or hand scoops.

The object of the invention is the provision of a handle embodying such improvements as will render it more convenient and comfortable to use, and which by virtue of such improvements may be used to considerably greater advantage in directing the delivery of material thrown from the shovel.

A further object is the provision of a shovel handle in which there is provided hand grips which will facilitate the convenient tilting of the implement about the longitudinal axis of the handle for directing the material thrown without subjecting the hand and arm to discomforting strain.

A still further object is the provision of a handle for shovels which provides a plurality of grips respectively adapted for use in the various manipulations of the implement and which afford the hand of the operator free and convenient movement from one grip to the other.

In the accompanying drawing wherein an approved embodiment of the invention is illustrated.

Fig. 1 is a side elevation of a shovel showing the invention applied to use;

Fig. 2 is a top plan elevation thereof;

Figs. 3 and 4 are views similar to Figs. 1 and 2 showing a modification of the invention.

Referring to the drawing in detail the numeral 5 indicates a conventional form of a shovel blade or scoop which is provided with a straight or curved staff or handle member 6 which for the major portion of its length is of the conventional form and which, for the sake of convenience and reference throughout this specification, will be hereinafter referred to as the "handle".

The invention relates to the structure of the terminal of the handle 6 opposite the scoop 5 and it is optional whether the invention is applied to use as by the separate formation of the handle terminal and its attachment to the body of the handle 6 or by forming the terminal part of the handle as an integral part of the body thereof. In either case the terminal is provided with an opening 7 of adequate size and shape to accommodate the fore-part of the hand and which, being of roughly triangular shape, defines the three side members 8, 9 and 10.

The members 8 and 9 constitute hand grips while the member 10 acts as a brace for lending strength and rigidity to the members 8 and 9.

The hand grip 8 lies above and in substantially parallel relation to the longitudinal axis of the handle 6 and is of such form that it may be conveniently grasped in the hand of the operator during use, the forward portion of the grip being enlarged as at 11 to provide a rest for the thumb. The hand grip 8 is so disposed as to be conveniently and comfortably gripped in one hand while the other embraces the handle 6, particularly when the implement is in a relatively low position, as in the act of filling the shovel.

The hand grip 9 which may be termed the terminal grip is disposed substantially perpendicular to the axis of the handle 6 and also to the front edge of the scoop or blade 5 and as in the case of the grip 8 is of such design as to comfortably fit in the grasp of the operator. It is to be noted that the grip 9, when the scoop or blade 5 is in the normal horizontal position, is disposed in a substantially vertical plane and slightly inclined forwardly at its upper terminal so as to fall conveniently within the grasp of the hand with the latter raised to the normal and natural position to the front or side of the body. The disposition of the grip 9 is different from that ordinarily employed in shovels which requires the twisting of the forearm to unnatural and uncomfortable position, particularly when the shovel is raised in the act of lifting and delivering its contents.

In the delivery of the contents of a shovel, as for instance in delivering and distributing fuel within a furnace, difficulty has been experienced in the past in causing a lateral deflection of material from the shovel to the right, although the lateral deflection to the left of such material may be conveniently accomplished. The difficulty in the lateral deflection of the material is due to the necessity of twisting the forearm and hand to the right, with the palm of the hand up-raised as usual. With the hand in this position the natural limit of further twisting motion of the forearm and hand is approximately reached, and further twisting as may be necessary to cause deflection of the material to the right is practically impossible. However, with the hand grip 9 disposed perpendicular to the plane of the edge of the blade or scoop 5, the hand is disposed in a comfortable normal position with the palm facing inwardly affording free twisting movement of the forearm and wrist in either direction for the convenient and axial deflection of the material in either direction.

In the modification of the invention illustrated in Figs. 3 and 4 the handle 6ᵃ carrying the blade or scoop 5ᵃ is provided at its terminal with a substantially open triangular element one of the apices of which is connected with the handle 6ᵃ and disposing the side member 15 thereof in a position perpendicular to the axis of the handle 6ᵃ, but parallel to the edge of the blade or scoop 5ᵃ. The arrangement of the grip 15 in Figs. 3 and 4 is turned to an angle of substantially 90° to a position in which it is shown in Figs. 1 and 2 and is approximately the same as the position of the hand grip of shovels in ordinary use. That is to say, the grip 15 is disposed so that it is grasped in the hand of the operator with the palm up and may be utilized to an advantage in manipulation of the implement to fill the scoop 5ᵃ. The grip 15 also facilitates the withdrawal of the implement from the pile after having filled the scoop.

The remaining sides of the triangular terminal of the handle 6ᵃ which extend divergently in opposite directions are suitably shaped to provide complementary hand grips 16 and, being disposed in angular relation to the axis of the handle 6ᵃ, may by being grasped in the hand of the operator be effectively used in causing the shovel to be tilted about its longitudinal axis in the act of distributing or delivering the material, either one or the other of the grips 16 being utilized for the purpose as best suits the convenience of the operator as indicated by the lateral direction in which it is desired to effect delivery.

The two forms of the invention illustrated in Figs. 1–2 and 3–4 are fundamentally similar and the same object is accomplished in both, that is, ease and convenience in the manipulation of the shovel with convenience and accuracy in directing or delivering material therefrom. In the case of the form shown in Figs. 1 and 2 such convenience and accuracy is obtained by the hand which grips the terminal hand grip 9 permitting the operator to conveniently tilt the implement about the axis of the handle 6 in either direction to cause lateral deflection of the material as desired. In the case of the arrangement shown in Figs. 3 and 4 where the terminal grip 15 is parallel to the edge of the scoop 5ᵃ either one or the other of the hand grips 16 is utilized for turning the implement about the axis of the handle 6ᵃ, according to the lateral direction in which it is desired to effect delivery from the scoop.

What I claim is:

1. In an implement, a blade having a front edge, a handle carried by the blade and a plurality of hand grips carried by the handle, said grips being disposed in angular relation to each other and in angular relation to the edge of the blade.

2. In an implement, a blade having a front edge, a handle carried by the blade, and hand grips carried by the handle each disposed in angular relation to the axis of said handle and the respective grips being disposed in oblique angular relation to each other.

3. An implement, including a blade and a handle carried thereby, the blade having a front edge, a plurality of angularly disposed hand grips carried by the handle, one of the hand grips lying in a plane substantially perpendicular to the axis of the handle and another of said grips being disposed out of line with the axis of said handle.

4. In an implement, a blade having a front edge, a handle carried by said blade, hand grips at the terminal of the handle, one of said grips being substantially perpendicular to the edge of the blade.

5. In an implement, a blade having a front edge, a handle carried by said blade, hand grips at the terminal of the handle, one of said grips being substantially perpendicular to the edge of the blade and another of said grips being substantially parallel to the axis of the handle.

6. In an implement, a blade having a front edge, a handle carried by said blade, hand grips at the terminal of the handle, one of said grips being substantially perpendicular to the edge of the blade and another of said grips being substantially parallel to the axis of the handle and displaced laterally from said handle.

7. In an implement, a blade having a front edge, a handle carried by said blade, hand grips at the terminal of the handle, one of said grips being substantially perpendicular to the edge of the blade and another of said grips being substantially parallel to the axis of the handle and being displaced laterally above the handle.

8. In an implement, a blade having a front edge, a handle carried by said blade, hand grips at the terminal of the handle, one of said grips being substantially perpendicular to the edge of the blade and another of said grips being substantially parallel to the axis of the handle, and a hand rest carried by the second mentioned grip.

9. In an implement, a blade, a handle carried by the blade and a substantially triangular element carried by the terminal of the handle forming a plurality of hand grips.

10. In an implement, a blade, a handle carried by the blade and a substantially triangular element carried by the terminal of the handle forming a plurality of hand grips, said triangular member lying in a plane substantially perpendicular to the blade.

In testimony whereof I affix my signature.

DAVID F. HERVEY.